(12) United States Patent
Naef et al.

(10) Patent No.: US 8,052,203 B2
(45) Date of Patent: Nov. 8, 2011

(54) SIDE PANEL FOR A VEHICLE

(75) Inventors: Max Naef, Bellach (CH); Alex Naef, Bellach (CH)

(73) Assignee: Carrosserie Hess AG, Bellach (CH)

( * ) Notice: Subject to any disclaimer, the term of this patent is extended or adjusted under 35 U.S.C. 154(b) by 342 days.

(21) Appl. No.: 12/338,926

(22) Filed: Dec. 18, 2008

(65) Prior Publication Data

US 2009/0189415 A1    Jul. 30, 2009

(51) Int. Cl.
  *B62D 31/00*    (2006.01)
(52) U.S. Cl. .......................................... 296/191; 296/178
(58) Field of Classification Search .................. 296/178, 296/191, 56
  See application file for complete search history.

(56) References Cited

U.S. PATENT DOCUMENTS

| 1,331,556 | A | * | 2/1920 | Blood | 217/60 E |
| 1,345,261 | A | | 6/1920 | Sellek | |
| 2,507,965 | A | | 5/1950 | Eichner | |
| 2,573,181 | A | * | 10/1951 | Burr | 160/191 |
| 3,698,464 | A | * | 10/1972 | Scheitel | 160/188 |
| 4,367,780 | A | * | 1/1983 | Walcher | 160/213 |
| 5,546,705 | A | * | 8/1996 | Hirtsiefer | 49/386 |
| 5,882,099 | A | * | 3/1999 | Salice | 312/328 |

FOREIGN PATENT DOCUMENTS

| DE | 27 22 009 A1 | 11/1978 |
| DE | 34 48 054 A1 | 7/1986 |
| DE | 199 21 927 A1 | 1/2000 |
| EP | 0 186 625 B1 | 7/1988 |

* cited by examiner

*Primary Examiner* — H Gutman
(74) *Attorney, Agent, or Firm* — Birch, Stewart, Kolasch & Birch, LLP

(57) ABSTRACT

The invention relates to a modular, replaceable side panel (1) for a vehicle, in particular for an omnibus. The side panel comprises in this case a pivotable cover plate (10) which is connected to a vehicle chassis (3) by an upper fastening and a lower fastening (2, 18). In this case a frame of the CO-BOLT® system is suitable, in particular, as a vehicle chassis (3). The upper fastening (2) comprises in this case a joint (7), in particular a film hinge (7). A securing device of the joint (7) is also present and the lower fastening (18) comprises a releasable locking device, the cover plate (10) being held in a closed position by the upper fastening and the lower fastening. The securing device comprises a lever (13) attached to the cover plate (10) with a spring clip (16) articulated thereto, the lever (13) and clip (16) together forming a toggle joint. A spring catch (17) is also present such that the toggle joint, with the cover plate (10) pivoted at a predetermined angle, is located behind a dead center position and at the same time the spring clip (16) is engaged in the spring catch (17) so that the cover plate (10) is secured at a predetermined angle.

14 Claims, 5 Drawing Sheets

SIDE PANEL FOR A VEHICLE

TECHNICAL FIELD

The invention relates to a modular, replaceable side panel for a vehicle, in particular for an omnibus, comprising a pivotable cover plate which is connected to a vehicle chassis by means of an upper fastening and a lower fastening, the upper fastening comprising a joint, in particular a film hinge, and a securing device of the joint also being present and the lower fastening comprising a releasable locking device, the cover plate being retained in a closed position by the upper fastening and the lower fastening.

PRIOR ART

Road vehicles such as omnibuses, and to a certain extent also rail vehicles, are frequently constructed nowadays on a frame structure as a base. Visual appearance, safety and economy of the vehicle represent in this case the essential requirements for the vehicle. Frame structures made from aluminum may be obtained for buses under the trade name CO-BOLT®, which are made up of individual modules. The modules consist in this case of longitudinal and transverse struts and an external frame to which floor plates and a roof may be fastened. Large windows, amongst other things, are fastened to the longitudinal and transverse struts of the structure which permit a view which is as wide as possible for the passengers. These large windows are generally adjoined to one another at the side such that they terminate at the top and at the bottom respectively along a line. Below the lower glass line, a side panel is generally attached which is fixedly fastened to the vehicle chassis, for example by rivets or screws. Side panels also exist which consist of openable and/or replaceable parts, such as for example flaps. In this connection, the side panel and the window frontage are intended to form a smooth plane and adjoin one another as seamlessly as possible, in order to achieve a visually attractive design of the side surface of a bus. Windows and fixedly fastened side panel parts may, for example, be directly attached to the struts of the frame structure.

The CO-BOLT® system discloses in this connection an aluminum vehicle chassis with transverse and longitudinal members, with at least one undercut groove, which serves as a retaining member for mutually fastening the frame parts and/or for vehicle components on the vehicle chassis and is disclosed, for example, in the European patent No. EP 0 186 625.

Openable flaps have the advantage that parts of the vehicle concealed by the flaps, for example parts of the engine or electrical components, are easily accessible from outside (for example for maintenance purposes). In the event of damage to the side panel, for example by a glancing collision, replaceable modules of the side panel additionally allow a particularly cost-effective repair of the vehicle. The opening of such side panels generally takes place such that flaps, which are frequently pivotably fastened to an upper joint, may be optionally folded back by the assistance of gas pressure springs. The flaps are frequently also held open by the gas pressure springs. The joint, by means of which the flap is fastened to the vehicle chassis, may in this case be a simple hinge or even a film hinge, a film hinge being formed by a resilient, often rubber-like connection between the mutually pivotable parts.

The CO-BOLT® system, as well as other similar frame structures, are used as light-weight vehicle chassis, which form the basis for a thin-walled yet stable bodywork. The stability of the frame structure in this case requires a minimum number of longitudinal and transverse struts. In order to keep a window region substantially free of frame elements, in this case horizontal frame elements have to extend on and/or below the lower glass line. Additionally, the wall thickness of the side walls of an omnibus is intended to be as small as possible, on the one hand, in order to gain sufficient space in the passenger compartment of the bus and, on the other hand, to keep the external dimensions of the vehicle as compact as possible. An integration of the known flaps with gas pressure springs in the disclosed vehicle frame is difficult for various reasons. Firstly, additional structural procedures generally have to be implemented on the vehicle frame. In particular, gas pressure springs have to have a certain minimum overall height in the vertical direction, which for example makes it necessary to interrupt horizontal frame parts of the structure. Also, the required overall depth of such systems is relatively large so that the space-saving advantages of a thin-walled frame design may not be utilized to their fullest extent.

In particular, in known side panels, the openable flaps typically have to have reinforcing elements and/or reinforcing strips attached to the inner face of the flap in order to prevent, for example with one-sided loading, a distortion of the flaps when closed against the relatively large forces of the gas pressure springs. This leads to permanent deformation which is undesirable both for aesthetic and safety reasons. Flaps made of a stronger material or a greater material thickness should be avoided for weight reasons. Such reinforcements require, however, corresponding receptacles and/or free spaces in the vehicle chassis (which possibly have to be provided by additional structural procedures) in which the reinforcements may be accommodated when the flaps are closed. Alternatively, the flaps together with the reinforcements may be mounted raised from the vehicle chassis which, however, might act against the requirement for a design of the bodywork which is as thin-walled as possible.

DESCRIPTION OF THE INVENTION

It is, therefore, the object of the invention to provide a side panel which belongs to the technical field mentioned in the introduction, which may be easily replaced and is suitable for use in vehicle chassis.

The solution of the object is defined by the features of claim 1. According to the invention, the securing device comprises a lever attached to the cover plate with a spring clip articulated thereto, the lever and clip together forming a toggle joint. A spring catch is also present, the toggle joint and the spring catch being designed and positioned such that the toggle joint, with the cover plate pivoted at a predetermined angle, is located behind a dead center position and at the same time the spring clip is engaged in the spring catch so that the cover plate is secured at a predetermined angle.

The cover plate may, in this case, be made from very different materials, for example from metal in the form of a metal sheet, from plastics or composite materials. In addition to a planar design of the cover plate, said cover plate may also have many different shapes, for example it may be curved.

The dead center position of a toggle joint denotes in this case an angular position in which the two limbs of the joint are located substantially parallel to one another. In the resting state, the lines of application of the static forces acting on the toggle joint are superimposed, if the toggle joint is located at the dead center position. In the dead center position of the toggle joint, therefore, all forces act on the toggle joint almost exclusively radially on the pivot point of the joint and oppose one another in pairs.

The cover plates of the side panel may in this case cover all supporting vehicle chassis elements over the entire length of the vehicle.

The securing device according to the invention allows an openable side panel with a particularly small installation depth. The securing device dispenses with the use of gas pressure cylinders, which are less suitable for use in particularly planar vehicle chassis due to their large space requirement. In contrast, the securing device of the side panel according to the invention may be designed to be particularly space-saving, in particular only approximately a third or half as long as a corresponding gas pressure spring. Also, the further elements of the side panel are configured such that an overall depth is achieved which is as small as possible with a simple construction. In particular, all elements in addition to the cover plate of the side panel may be accommodated within the frame of the structure, concealed behind the cover plate, without projecting over the frame on a vehicle inner face or outer face.

Thus this space-saving side panel of particularly simple design is, as a whole, particularly suitable for use in frame structures, in particular in particularly thin-walled frame structures such as, for example, may be produced using the commercially available system with the trade name CO-BOLT® (Carrosserie Hess AG, Switzerland).

As, according to the invention, the use of gas pressure cylinders is entirely dispensed with, the mechanical loads when opening or closing the cover plate, which in conventional systems are exerted by a gas pressure cylinder on the cover plate, are also markedly lower. Therefore, the cover plate may be designed to be particularly thin and light-weight, without in this case additional reinforcing elements having to be provided. The cover plate only has to be substantially self-supporting and does not have to be able to absorb additional forces, for example from gas pressure springs.

As, according to the invention, it is possible to dispense with reinforcing elements entirely, the cover plate may bear substantially directly against the vehicle chassis and/or be mounted thereon at a relatively small distance therefrom. The side panel according to the invention only contributes, in this case, to an external dimension of the frame structure substantially as a result of the thickness of the cover plate, i.e. only makes the frame appear thicker, for example, in the millimeter range. Thus it is possible that the outer surface of the cover plate merges seamlessly with an outer face of the side glazing of the vehicle side, without having to lose large amounts of the volume of the internal space. In particular, therefore, the entire vehicle side has no projections and may be configured to be smooth and uniform. In this connection, all frame parts of the structure are also substantially concealed by the side panel and/or by the side glazing.

Thus, on the one hand, an attractive and, on the other hand, a secure side panel is possible: as no individual hinges project from the side panel and the modules of the side panel form a smooth plane, the risk of injury for other road users, for example pedestrians or cyclists, is kept as low as possible.

Additionally, the modular construction of the side panel, insofar that individual cover plates of the side panel may be replaced independently of one another, allows the vehicle to be repaired in a particularly cost-effective manner after damage to an individual flap or a plurality of flaps.

As the side panel comprises openable cover plates, it is additionally possible in a simple manner to reach elements located behind the side panel from outside, for example engine parts or parts of the on-board electrics. This also simplifies the replacement or repair of elements located in the vehicle, i.e. behind the side panel.

Advantageously, the lever has a predetermined breaking point. The lever, which, as part of the securing device of the joint, cooperates with the spring catch via the spring clip, may also be designed such that it breaks at high, unexpected loading of the securing device before the spring clip and the spring catch, i.e. at a lower loading than the spring clip and the spring catch. In particular, it is thereby achieved that other elements of the securing device and/or of the joint are protected from damage in the event of overload. In this preferred embodiment, the lever is provided as a wear part which may be easily replaced. As an easily replaceable wear part, the lever does not cause high costs if it breaks and is, therefore, particularly suitable to be provided as the weakest element of the securing device, i.e. as a predetermined breaking point. In this case, it is insignificant whether the lever comprises an obvious predetermined breaking point or whether the lever as such is constructed in its entirety such that it already breaks when subjected to lower loads than the remaining parts of the securing device.

It is also possible that the lever has no such predetermined breaking point and a design of the lever as a wear part which breaks easily compared to other elements may also be dispensed with.

Preferably, the lever or the spring catch or both elements are made from plastics. Plastics are characterized in particular by economical manufacture and low costs. Their stability may be substantially adjusted by their material composition and production parameters. Thus it is possible to produce the elements with specific strengths. Plastics parts may additionally be particularly advantageously produced in large quantities.

The lever or the spring catch or both elements may also be made from a different material from plastics. It is, for example, possible to produce these parts from metal.

In a preferred embodiment, the lever is attached to the cover plate via a dovetail guide. The rail of the dovetail guide may in this case be fastened to the cover plate, for example adhesively bonded thereon, and preferably extends substantially horizontally along the cover plate. The lever is then preferably designed such that it comprises a foot, which may be inserted as a spring into the dovetail guide-shaped rail. Thus the lever may be displaced only along the dovetail guide and is otherwise fixedly fastened to the cover plate. By the simple displacement of the lever on the cover plate, said lever is able to be particularly easily replaced, without individual adhesive joints or similar fastenings having to be released.

Alternatively and additionally, the lever may be attached by other fastening means to the cover plate. For example, the lever may be secured by locking pins in the dovetail guide against displacement along the guide. It is also conceivable, for example, that the lever is bonded, riveted or screwed directly onto the cover plate.

Advantageously, the spring catch is directly fastened to the vehicle chassis, for example to a CO-BOLT® frame system. The spring catch is in this case attached to transverse or longitudinal struts of the vehicle chassis, such that the spring clip is engaged therein, as soon as the toggle joint is located at a predetermined angular position. The position of the spring catch may be adjusted along one of the transverse or longitudinal struts in this case. The spring catch may be attached and/or anchored to the vehicle chassis by a multiplicity of fastening means. It may, for example, be screwed, riveted, bonded or connected to the struts. It is also conceivable that specific transverse or longitudinal struts already contain a spring catch as an integral component.

Alternatively, the spring catch may also be fastened indirectly to the vehicle chassis. For example it is conceivable that the spring catch is fastened to a different part of the side panel such as an adjacent cover plate which may not be folded up or via an intermediate part to one of the transverse or longitudinal struts.

In a preferred embodiment, the locking device comprises a spring lock, the spring lock comprising a spring element attached to the vehicle chassis and a latching element attached to the cover plate. The spring element in this case cooperates in the manner of a locking spring with the latching element, such that the lock is held closed by the spring force and a force acting counter to the spring force has to be applied for opening the lock. The spring element may in this case preferably be released from outside from the latching element by a simple hand movement and the cover plate opened.

Alternatively, such a spring lock may also be dispensed with. In this case, it is possible both to close the cover plate with a different type of lock, for example a conventional square-socket lock and to lock the cover plate by magnets or other fastening means.

Preferably, the spring element is attached to the vehicle chassis via a fastening element of similar construction to the spring catch. As the same components may be used for the spring catch and the fastening element, the device is more flexible as a whole, as fewer different parts have to be used. As a result of the increased quantity, the manufacturing costs of the individual parts is reduced. The component which serves as a spring catch and/or fastening element, is additionally designed such that its position may be adjusted along the transverse or longitudinal strut to which it is fastened. As a result, a high degree of flexibility with regard to the desired arrangements of the individual elements is also permitted.

Alternatively, a separate part may also be used for each of the elements. It is also possible that the spring element is directly attached to a part of the vehicle chassis, i.e. without a separate fastening element.

Advantageously, the cover plate is held in an open position by the securing device. The securing device is constructed such that it is able to hold the weight of the cover plate in a defined, pivoted and thus open position of the cover plate. With a particularly heavy cover plate, a correspondingly greater number of securing devices have to be provided. Between the open position of the cover plate and its closed position, the securing device, in contrast to one of the conventional gas pressure springs, has no supporting action, so that it is only latched in the open position.

It is also possible that the securing device is constructed such that the cover plate may be held by it in further positions, for example in a further pivoted position which is open to a lesser degree.

In a preferred embodiment, the lower fastening has a bearing surface on which the latching element attached to the cover plate bears in the closed position, so that substantially the entire weight of the cover plate is absorbed by the lower fastening. Such a bearing surface ensures additional stability of the cover plate and an unloading of the joint of the upper fastening otherwise supporting the entire weight of the cover plate in its closed position. As the cover plate is designed to be as light-weight as possible, and in spite of a very thin design does not have to have reinforcements, a stabilizing of the cover plate on its underside in the closed state is particularly advantageous.

Alternatively, such a bearing surface may also be dispensed with. The cover plate may also be fastened and stabilized on its lower fastening in a different manner than by a bearing surface, for example by screws, rivets, pins or adhesive joints. In addition it is also conceivable that the locking device may itself be designed such that it additionally stabilizes the cover plate. Additionally, a stabilizing by a bearing surface of the lower fastening is also possible such that substantially the entire weight of the cover plate is not absorbed.

Advantageously, the vehicle chassis comprises damping buffers which serve as a stop for the cover plate in the closed position. The damping buffers DB are preferably positioned on all bearing surfaces between the cover plate and the vehicle chassis, in particular in the region of the lower fastening, and are shown represented schematically as labeled rectangular box DB in FIG. 3(a). They prevent rattling of the cover plate and may ensure a fastening of the cover plate substantially without clearance.

It is also possible to dispense with the damping buffers. The cover plate may also bear directly against the vehicle chassis.

In a preferred embodiment, the entire installation depth of the side panel is at most 13 mm. Such an embodiment may be easily used together with the CO-BOLT® vehicle chassis. The entire installation depth thus denotes the depth of the side panel from the outer surface of the cover plate, i.e. remote from the interior of the vehicle, as far as a part of the side panel, i.e. for example a part of the upper and/or lower fastening which projects the furthest into the interior of the vehicle. If this entire installation depth of the side panel is at most 13 mm, the side panel may comprise a thin cover plate, for example 3 mm thick, directly bearing against the vehicle chassis of the CO-BOLT® system and a securing device, the securing device not projecting over the transverse or longitudinal struts of the vehicle chassis in the direction of the interior of the vehicle. Thus the thickness of the side wall may be kept as small as possible. It is restricted by the width of the vehicle chassis, and does not have to be increased by the side panel according to the invention.

Alternatively, the overall installation depth of the side panel may also be greater than 13 mm. The functions of the individual elements of the fastenings and the side panel are, as a result, not affected as a whole.

Advantageously, a lamp housing LH is incorporated in the cover plate which terminates with a surface of the cover plate, and is shown schematically as labeled rectangular box LH in FIG. 3(a). Such a lamp housing is, for example, suitable for receiving lamps for marking the lateral outline of the vehicle. The housing in this connection projects in the direction of the interior of the vehicle from the cover plate and terminates flush with the outer surface of the cover plate or is embedded in the outer surface of the cover plate. In this manner, in the region of the lamps a smooth surface of the side wall of the vehicle is also ensured, whereby on the one hand a further risk of injury is eliminated and, on the other hand, the risk of damage to the lamp is reduced. If, for example, as a result of a collision a lamp housing has been damaged, it may be easily replaced together with the surrounding cover plate.

Such a lamp housing in the cover plate may also be dispensed with. In addition it is also possible that a lamp housing is positioned on the outer face of the cover plate or partially projects beyond the outer face of the cover plate. It may, for example, also be incorporated into the cover plate, such that a part of the lamp housing projects from the side surface of the vehicle to function as a directional indicator.

An omnibus comprising a vehicle chassis and a side panel according to the invention fastened thereto, has a safe side panel which requires little attention and maintenance and thus generates only relatively low maintenance costs. In this case, the side panel, in particular the fastening devices of the cover plates, may be accommodated in the vehicle chassis such that, on the one hand, no essential structural procedures are necessary on the frame and, on the other hand, no parts of the side panel project on the inside over the vehicle chassis into the vehicle interior. Additionally, when the side panel is closed and fastened at the top and at the bottom the cover plates substantially bear against the vehicle chassis (apart from otherwise present damping elements and/or coatings between the frame and cover plate) so that even without additional bracing of the cover plates a sufficient stability of the bus exterior is ensured. In particular, the side panel overlaps in this case the supporting elements of the vehicle chassis present in the region of the side panel, and advantageously contributes, due to the design according to the invention, to the fact that an external cladding of the bus forms a substantially smooth surface with a low risk of injury for other road users. Additionally, an omnibus with a side panel according to the invention has a maximized interior which may be used optimally, without increasing its external dimensions in the process, in comparison with conventional side panels not according to the invention. Not least, the side panel of the omnibus also allows a visually attractive design of the external cladding of the bus. According to the invention, an omnibus which is based on a vehicle chassis produced with the CO-BOLT® system, is particularly easily equipped with the side panel, as all components of the side panel are adjusted to the CO-BOLT® system and cut to size. In addition to omnibuses, naturally also rail vehicles or other vehicles with a corresponding vehicle chassis may comprise a side panel according to the invention.

Further advantageous embodiments and combinations of features of the invention are revealed from the following detailed description and the entirety of the patent claims.

BRIEF DESCRIPTION OF THE DRAWINGS

In the drawings used to explain the exemplary embodiment.

In principle, in the figures the same parts are provided with the same reference numerals.

MEANS FOR IMPLEMENTING THE INVENTION

Figure 1:
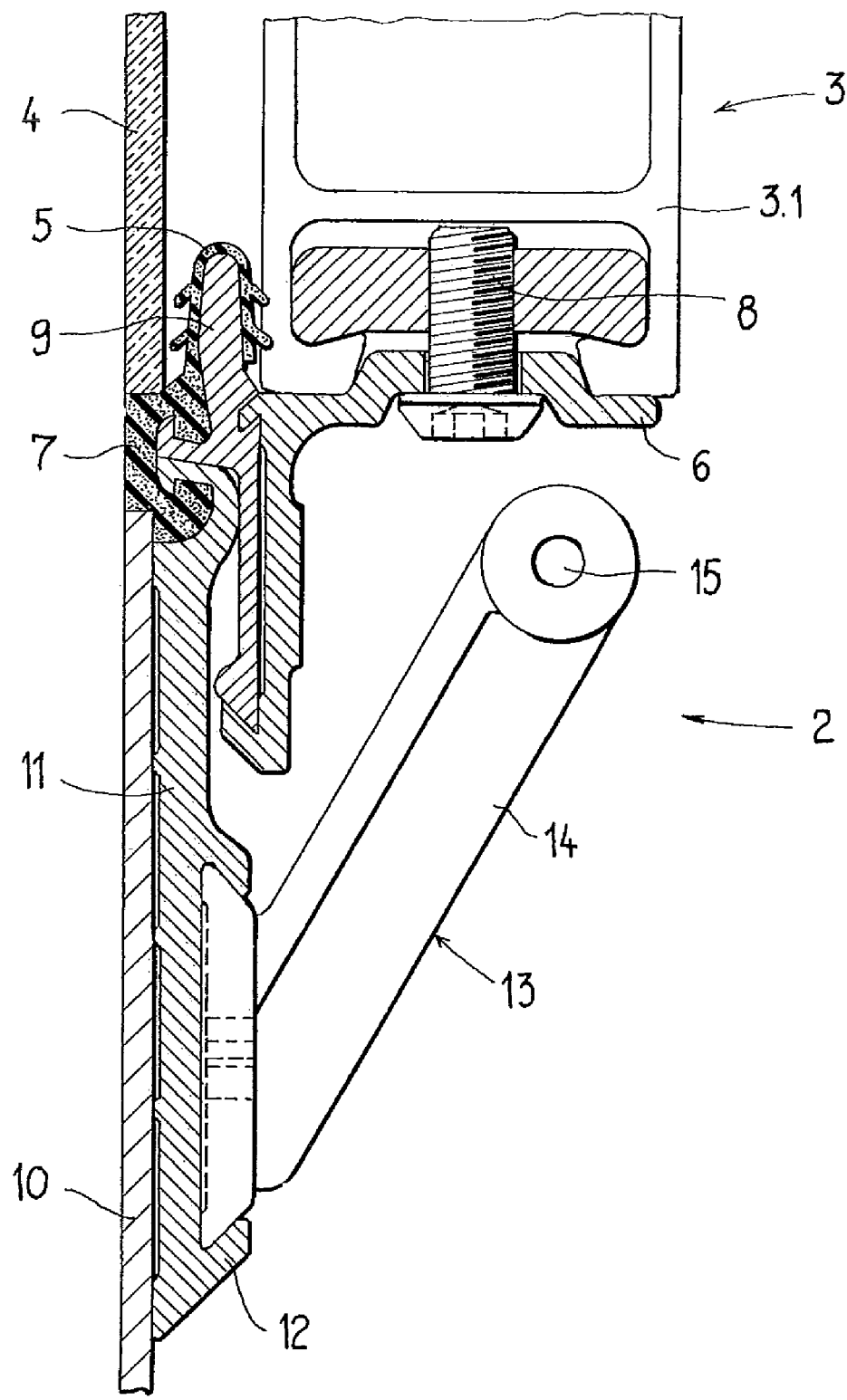
FIG. 1 shows a side view of an upper fastening according to the invention.

FIG. 1 shows a side view of an upper fastening 2 according to the invention. A transverse strut 3.1 of a CO-BOLT® vehicle chassis 3 is shown in the upper part of the figure in cross section. On the left side of the figure, the outer face of a vehicle is shown. It is formed in the upper part of FIG. 1, at the side adjacent to the illustrated transverse strut 3.1 by a glass pane 4, which is attached to the vehicle chassis 3 via a seal 5. A fastening 6 for a film hinge 7 is anchored to the transverse strut 3.1 in a lower region. The fastening 6 is attached to the transverse strut 3.1 by an anchoring element 8 typical of the CO-BOLT® system. The fastening 6 is configured as a right-angled angular piece. It holds a stabilizer 9 for the film hinge 7 which partially engages in the joint between the glass pane 4 and the vehicle chassis 3 as a support of the seal 5.

Flush underneath the glass pane 4 is adjoined the film hinge 7 which consists of rubber and at the same time undertakes a sealing function between the glass pane 4 and the cover plate 10. The cover plate 10 is in turn attached flush underneath the film hinge 7. In addition to the stabilizer 9 for the film hinge 7 of U-shaped configuration which partially engages in the hollow space formed by the film hinge 7, a part of a first dovetail guide 11 is also located in this hollow space which is bonded onto the cover plate 10. The first dovetail guide 11 also forms, therefore, a connection between the cover plate 10 and the film hinge 7. The fastening 6 of the film hinge 7 as well as the stabilizer 9 thereof form a stop for the first dovetail guide 11 which extends parallel to the cover plate 10 located in its closed position. On the first dovetail guide 11 a lever 13 is held in a dovetail-shaped rail 12, which is thus fastened to the cover plate 10.

The lever 13 has a shaft 14 extending bent-back from the cover plate 10, which has at its end opposing the cover plate 10 a circular recess 15. The lever 13 with the recess 15 is part of a toggle joint which is not shown fully in FIG. 1.

Figure 2:
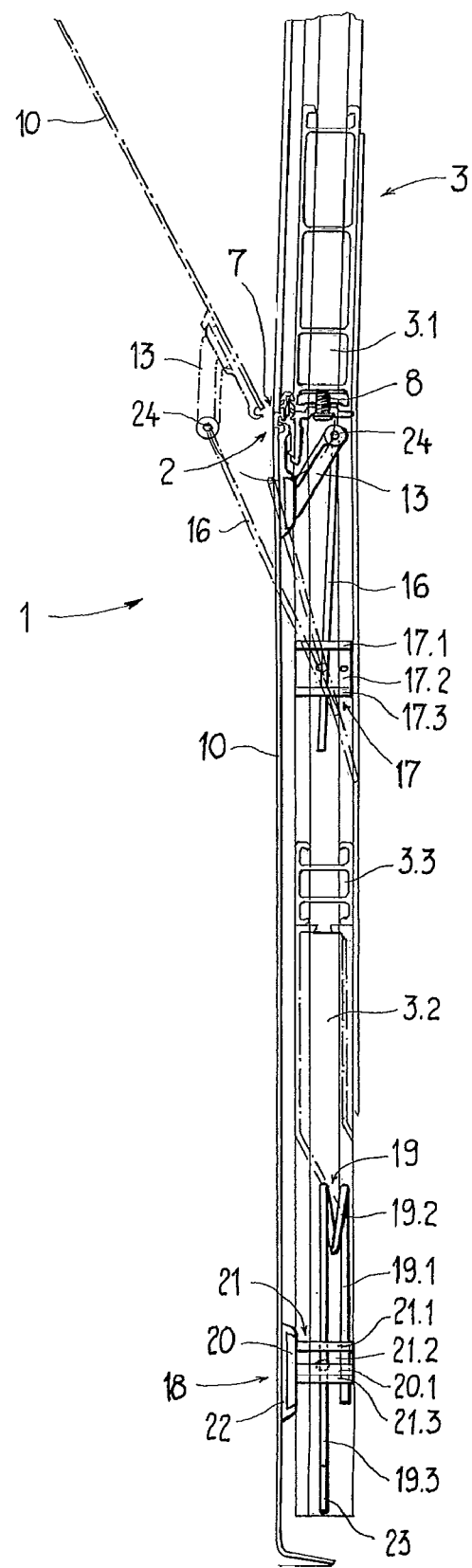
FIG. 2 shows a side view of a side panel according to the invention with the cover plate in the open position and in the closed position.

FIG. 2 shows a side panel 1 according to the invention in a side view, in this case the cover plate 10 being illustrated both in a closed, and also in an open, position (shown as a dashed line). As already shown in FIG. 1, in the upper part of FIG. 2 a transverse strut 3.1 of a vehicle chassis 3 is located to which a glass pane 4 is attached. Below the glass pane is adjoined the film hinge 7, which is fastened to the transverse strut 3.1 in the above disclosed manner.

The cover plate 10 is shown in FIG. 2 initially in its closed position. In this position, which corresponds to the position of the cover plate 10 of FIG. 1, the cover plate 10 extends in the same plane as the glass pane 4, and thus forms the outer side surface of the vehicle. On the lever 13 made of plastics, which is connected to the cover plate 10 in the above disclosed manner, is adjoined a metal spring clip 16. The spring clip 16 forms with the lever 13 a toggle joint, the rotational axis 24 thereof being located in the circular recess 15 of the lever. A part of the spring clip 16 extending substantially horizontally penetrates this circular recess 15, whereby the lever 13 is able to be pivoted about the rotational axis 24 formed by the horizontal part of the spring clip 16.

The spring clip 16 extends in the closed position of the cover plate 10 substantially vertically and is held in a spring catch 17. The spring catch 17 is made from plastics and is anchored at the side on a longitudinal strut 3.2 of the vehicle chassis 3 slightly below the position of the lever 13 fastened to the cover plate 10. The spring catch 17 comprises two surfaces 17.1, 17.3 aligned substantially horizontally with guides for the spring clip 16. Said spring catch is anchored to the longitudinal strut 3.2 via a connecting piece 17.2 of the spring catch 17 extending in a perpendicular manner and connecting the two horizontal surfaces.

Further below the spring catch 17 is located a second transverse strut 3.3 which extends parallel to the transverse strut 3.1 between two longitudinal struts. The vehicle chassis 3 comprises a multiplicity of such transverse and longitudinal struts. They form a frame for the entire cladding of the vehicle.

In turn, the lower fastening 18 is shown below the second transverse strut 3.3. The lower fastening 18 comprises a spring lock with a spring 19 and a latching element 20. The spring 19 is formed by a bent metal clip. The clip extends in this case initially in a linear manner and thus forms a first spring leg 19.1. On the first spring leg 19.1 is attached a screw-shaped bent part 19.2 of the metal clip. The clip extends in this case along one-and-one-half circular windings and subsequently opens into a second spring leg 19.3 which is formed by a part of the metal clip, in turn extending in a linear manner. By the mechanical resilience of the clip in the bent part 19.2 of the spring, the two spring legs 19.1, 19.3 may be moved transversely relative to one another. In this case, they perform a pivoting movement which substantially extends about an axis in the center point of the bent part 19.2 of the spring. The spring legs 19.1, 19.3 may thus be pressed against one another by an expenditure of force, the spring force then acting in reverse in the direction of the resting position of the spring legs 19.1, 19.3.

The first spring leg 19.1 is fastened to the longitudinal strut 3.2 of the vehicle chassis 3. The fastening of the spring 19 is in this case implemented by a fastening element 21 similar to the spring catch 17. The fastening element 21 is anchored to the longitudinal strut 3.2 of the vehicle chassis 3, and comprises two horizontally aligned surfaces 21.1, 21.3 which are connected to one another by a vertical connecting piece 21.2, via which the fastening element 21 is anchored to the vehicle chassis 3.

The cover plate 10 has in the region of its lower end opposing the film hinge 7 a second dovetail guide 22 which is bonded to the cover plate 10. The second dovetail guide 22 serves for fastening the latching element 20 to the cover plate 10. The latching element 20 is in this case formed by a web 20.1 fastened in the second dovetail guide 22 which is located perpendicular to the cover plate 10. The web 20.1 forms in this case an abutment in which the second spring leg 19.3 engages in the closed position of the cover plate 10. Thus the locking device is formed by the cooperation of the spring 19 and the latching element 20. Furthermore, the web 20.1 also forms a support which comes to bear against the fastening element 21 in the closed position. The fastening element 21 thus forms a bearing surface for the latching element 20 which stabilizes the cover plate 10 in the closed position.

The cover plate 10 has at its lower end a part which is inwardly bent-back, and which is bent about the lower end of the vehicle chassis 3. For opening the locking device, the second spring leg 19.3 of the spring 19 located behind the cover plate 10 may be moved toward the first spring leg 19.1 and the latching element 20 may thus be released. In order to simplify the opening process, the second spring leg 19.3 therefore has a finger loop 23 which may be seen more clearly in FIG. 4.

With cover plates 10 of the side panel 1 to be opened frequently, it may alternatively be provided that the second spring leg 19.3 is lengthened and projects below the cover plate 10. In such an embodiment, the cover plate 10 would not be folded up at its lower end as shown in FIG. 2, in order to permit an uninterrupted movement of the second spring leg 19.3. The second spring leg 19.3 could thus be moved without having to grip behind the cover plate 10.

The opened cover plate 10 is shown together with the correspondingly positioned elements as a dashed line. The cover plate 10 has a large opening angle between the closed and the open position. The lever 13 is located substantially vertically in this opening angle and thus parallel to the longitudinal strut 3.2 of the vehicle chassis 3. The toggle joint formed at the end of the lever 13 between the lever 13 and the spring clip 16 is located behind its dead center position. The spring clip 16 is engaged in the spring catch 17, in the situation shown here as a dashed line, so that the securing device retains the cover plate 10. The alignment of the spring clip 16 in its engaged position is such that a force acting on the toggle joint from the lever 13 on the spring clip 16, is oriented substantially in the longitudinal direction of the spring clip 16. The longitudinal direction of the spring clip 16 thus extends substantially perpendicular to the connecting line between the recess 15 in the lever 13 through which the rotational axis 24 of the toggle joint extends and the pivot point of the film hinge 7.

Figure 3:
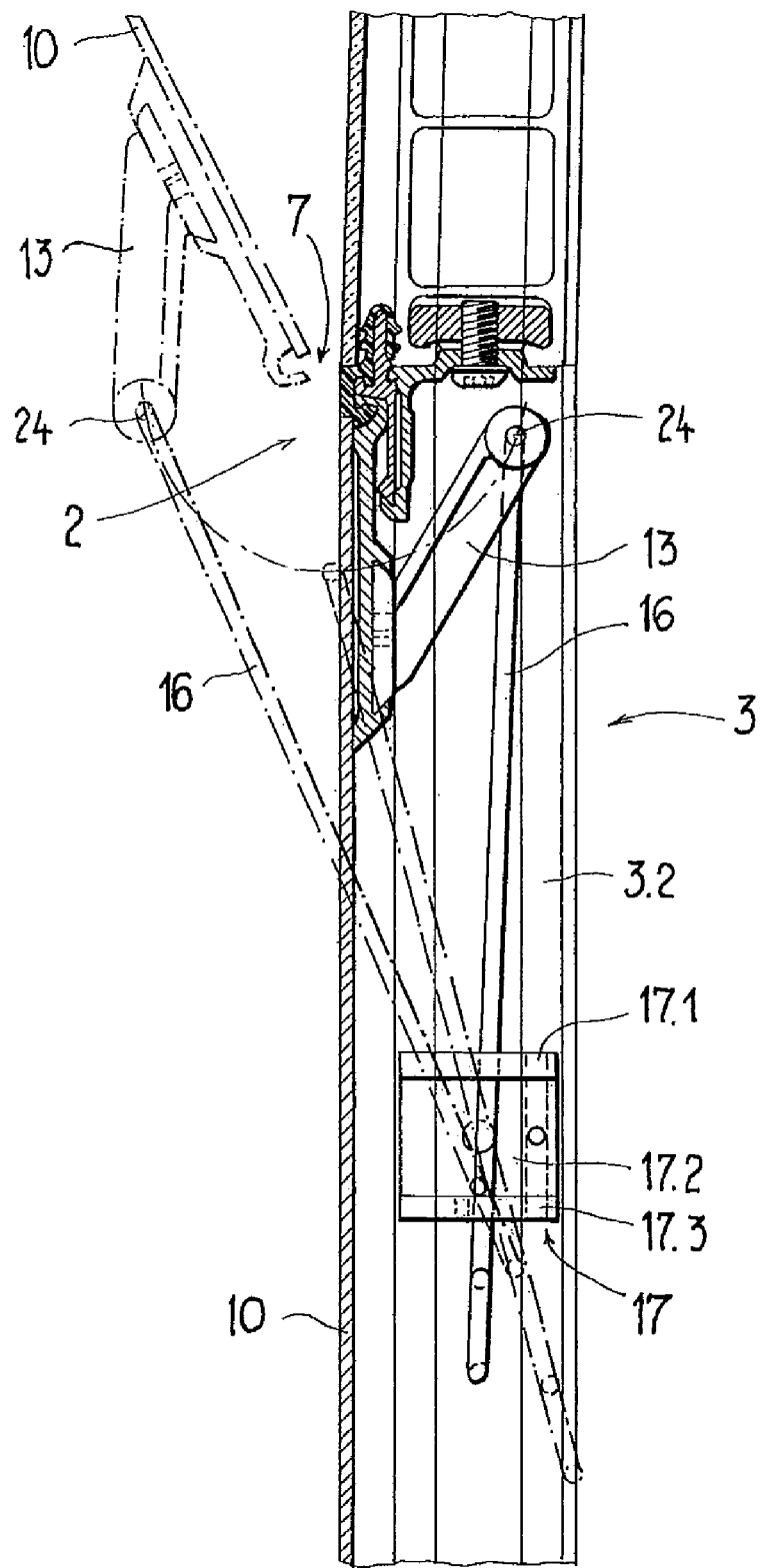
FIG. 3 shows a side view of an upper fastening according to the invention with the cover plate in the open position and in the closed position.
Figure 3A:
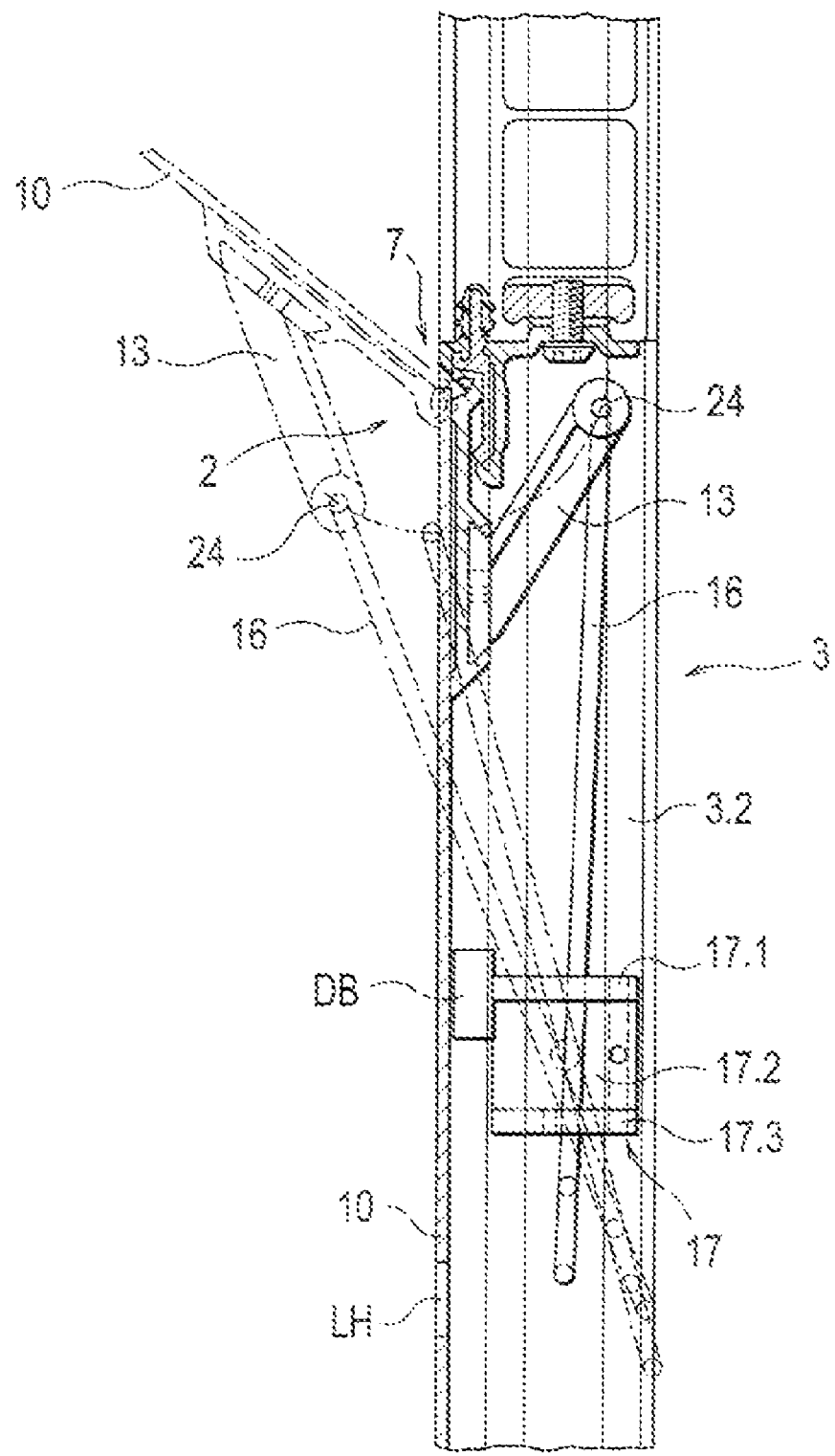
FIG. 3(a) shows a schematic view, similar to the view in FIG. 3, indicating the dead center position of the lever and the spring clip.

FIG. 3 shows a detail of the side panel 1 shown in FIG. 2, in the region of the upper fastening 2. In this FIG. 3, the mutual position of the rotational axis 24 of the toggle joint and of the pivot point of the film hinge 7 may be seen more clearly. As in FIG. 2 the cover plate 10 is shown in a closed position. The toggle joint between the lever 13 and the spring clip 16 is in its folded-up state. The lever 13 in this case does not project in the direction of the interior of the vehicle beyond the vehicle chassis 3. The spring clip 16 connects the toggle joint and the spring catch 17 and does not absorb any force in the closed position.

In the open position of the cover plate 10, which is shown as a dashed line in FIG. 3, as in FIG. 2, the cover plate 10 is opened at an opening angle of considerably greater than 90° and less than 180°, namely by 153.3°. The lever 13 which is fastened to the cover plate 10, extends at this opening angle substantially vertically so that the toggle joint, proceeding from its folded-up position, is located behind a dead center position, in which the alignment of the lever 13 and the alignment of the spring clip 16 are substantially parallel. The toggle joint is brought closer to the dead center position during the opening process, i.e. from its folded-up position, and reaches and exceeds the dead center position, so that it is located in the open position behind the dead center position. A virtual connecting line between the pivot point of the film hinge 7 and the rotational axis 24 of the toggle joint extends in this open position substantially perpendicular to the alignment of the spring clip 16. The spring clip 16 absorbs the force acting as a result of the weight of the cover plate 10 via the lever 13 on the spring clip 16, therefore, substantially in the longitudinal direction. Related to the fact that the position of the spring clip 16 is perpendicular to the connecting line between the pivot point of the film hinge 7 and the rotational axis 24 of the toggle joint, is the disclosure that the alignment of the spring clip 16 lies tangentially to the circular trajectory of the rotational axis 24 of the toggle joint about the pivot point of the film hinge 7 when opening or closing the cover plate 10. The dead center position of the lever and spring clip is shown schematically in FIG. 3(*a*).

The spring clip 16 is engaged in the spring catch 17 in the open position of the cover plate 10. As the spring clip 16 may not be displaced in this engaged position, the cover plate 10 is, therefore, locked by the securing device.

Figure 4:
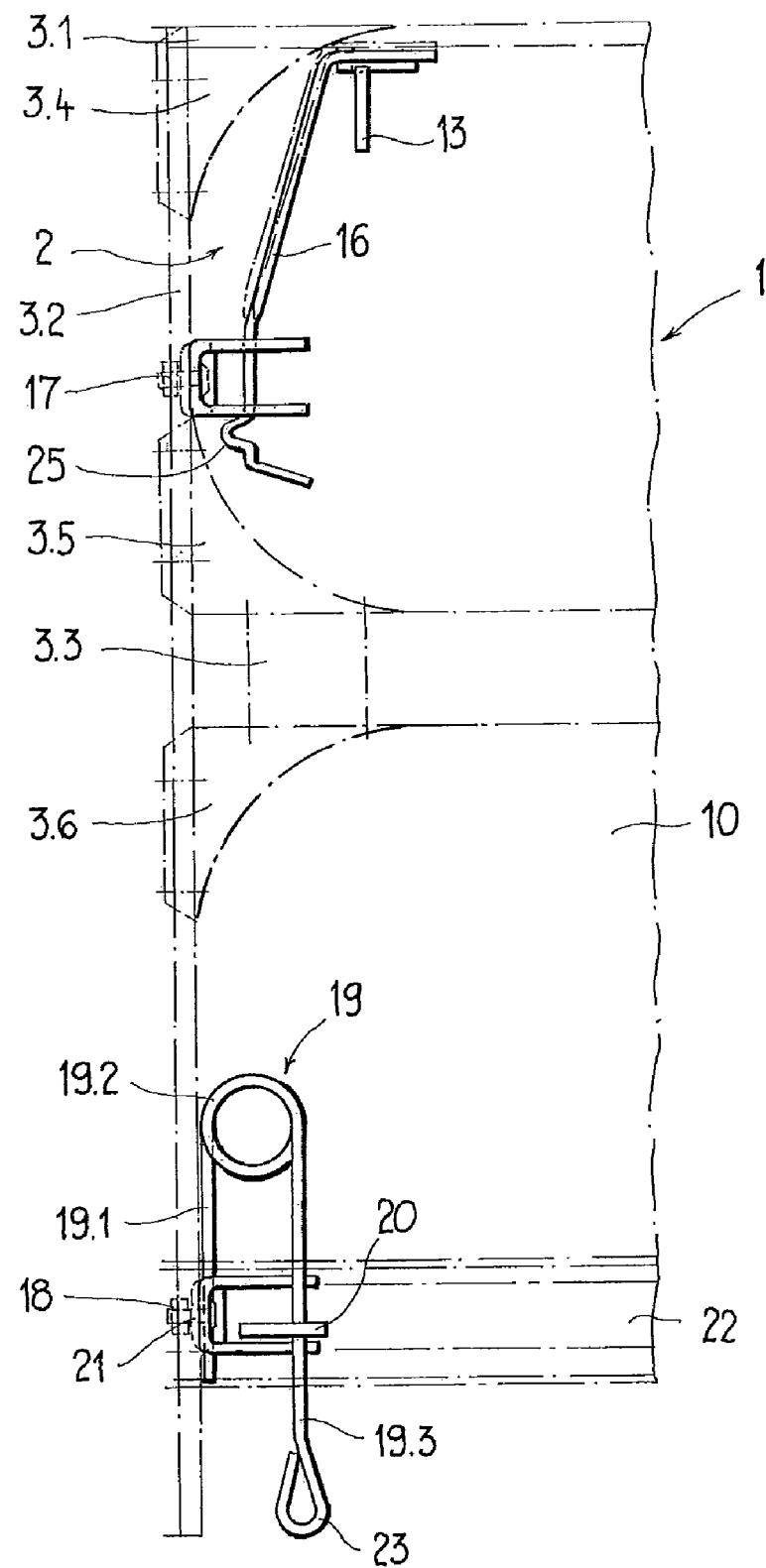
FIG. 4 shows a front view of a part of a side panel according to the invention.

FIG. 4 shows a front view of a part of a side panel 1 according to the invention. A part of the vertically extending longitudinal strut 3.2 of a vehicle chassis 3 is illustrated on the left edge of FIG. 4. The spring catch 17 of the upper fastening 2 as well as the fastening element 21 of the lower fastening are anchored on the longitudinal strut 3.2 in the above described manner. The spring catch 17, as also described above, guides the spring clip 16 which forms a toggle joint with the lever 13. In FIG. 4, a U-shaped bulge 25 of the spring clip 16 is shown, which cooperates with the spring catch 17 as a catch. When the bulge 25 engages in the spring catch 17, the spring clip 16 is fixed longitudinally.

In the lower part of FIG. 4, the lower fastening 18 is illustrated with the spring 19, the fastening element 21 and the latching element 20 which is attached to the cover plate 10 as already disclosed above by means of the second dovetail guide 22. In this FIG. 4, the finger loop 23 is clearly visible. In this view the second spring leg 19.3 which is provided with the finger loop 23, is moved to the left, in order to release the spring 19 from the latching element 20 on the cover plate 10.

FIG. 4 shows, moreover, the transverse struts 3.1, 3.3 of the vehicle chassis 3, also shown in the above described figures, which extend perpendicular to the longitudinal strut 3.2. The transverse struts 3.1, 3.3 are connected to the longitudinal strut 3.2 via corner pieces 3.4-3.6, which ensure a high degree of stability of the vehicle chassis 3.

In summary, it has to be emphasized that by means of the invention an attractive side panel for a vehicle has been provided, which together with a side window frontage forms a smooth external surface of the vehicle and has a very small installation depth. As a result of the modular design of the side panel which is replaceable and openable, said side panel is additionally particularly user-friendly and suitable for everyday use.

The invention claimed is:

1. A modular, replaceable side panel for a vehicle, comprising a pivotable cover plate which is connected to a vehicle chassis by means of an upper fastening and a lower fastening, the upper fastening comprising a joint, and a securing device of the joint also being present and the lower fastening comprising a releasable locking device, the cover plate being held in a closed position by the upper fastening and the lower fastening, wherein the securing device comprises a lever attached to the cover plate with a spring clip articulated thereto, the lever and clip together forming a toggle joint, and a spring catch also being present such that the toggle joint, with the cover plate pivoted at an opening angle of considerably greater than 90° and less than 180°, is located behind a dead center position, whereby the lever which is fastened to the cover plate, extends at an opening angle substantially vertically so that the toggle joint, proceeding from a folded-up position, is located behind a dead center position, in which the alignment of the lever and the alignment of the spring clip are substantially parallel and at the same time the spring clip is engaged in the spring catch so that the cover plate is secured at the opening angle of considerably greater than 90° and less than 180°.

2. The side panel as claimed in claim 1, wherein the lever has a predetermined breaking point.

3. The side panel as claimed in claim 1 or 2, wherein the lever is made from plastics.

4. The side panel as claimed in claim 1 or 2, wherein the spring catch is made from plastics.

5. The side panel as claimed in claim 1 or 2, wherein the lever is attached to the cover plate via a dovetail guide.

6. The side panel as claimed in claim 1 or 2, wherein the spring catch is directly fastened to the vehicle chassis.

7. The side panel as claimed in claim 1 or 2, wherein the locking device comprises a spring lock, the spring lock comprising a spring element attached to the vehicle chassis and a latching element attached to the cover plate.

8. The side panel as claimed in claim 7, wherein the spring element is attached to the vehicle chassis via a fastening element, which is anchored to a longitudinal strut of the vehicle chassis, and comprises two horizontally aligned surfaces which are connected to one another by a vertical connecting piece, via which the fastening element is anchored to the vehicle chassis.

9. The side panel as claimed in claim 1 or 2, wherein the cover plate is held in an open position substantially by the securing device.

10. The side panel as claimed in claim 1 or 2, wherein the lower fastening has a bearing surface on which the latching element attached to the cover plate bears in the closed position, so that substantially the entire weight of the cover plate is absorbed by the lower fastening.

11. The side panel as claimed in claim 1 or 2, wherein the vehicle chassis comprises damping buffers which serve as a stop for the cover plate in the closed position.

12. The side panel as claimed in claim 1 or 2, wherein the entire installation depth of the side panel from the outer surface of the cover plate, as far as a part of the side panel which projects the furthest into the interior of the vehicle, is at most 13 mm.

13. The side panel as claimed in claim 1 or 2, wherein a lamp housing is incorporated in the cover plate which terminates with a surface of the cover plate.

14. A modular replaceable side panel and vehicle chassis for a vehicle, comprising a pivotable cover plate which is connected to the vehicle chassis by means of an upper fastening and a lower fastening, the upper fastening comprising a joint, and a securing device of the joint also being present and the lower fastening comprising a releasable locking device, the cover plate being held iii a closed position by the upper fastening and the lower fastening, wherein the securing device comprises a lever attached to the cover plate with a spring clip articulated thereto, the lever and clip together forming a toggle joint, and a spring catch also being present such that the toggle joint, with the cover plate pivoted at an opening angle of considerably greater than 90° and less than 180°, is located behind a dead center position, whereby the lever which is fastened to the cover plate, extends at an opening angle substantially vertically so that the toggle joint, proceeding from a folded-up position, is located behind a dead center position, in which the alignment of the lever and the alignment of the spring clip are substantially parallel and at the same time the spring clip is engaged in the spring catch so that the cover plate is secured at the opening angle of considerably greater than 90° and less than 180°.

* * * * *

UNITED STATES PATENT AND TRADEMARK OFFICE
CERTIFICATE OF CORRECTION

| | | |
|---|---|---|
| PATENT NO. | : 8,052,203 B2 | Page 1 of 1 |
| APPLICATION NO. | : 12/338926 | |
| DATED | : November 8, 2011 | |
| INVENTOR(S) | : Max Naef | |

It is certified that error appears in the above-identified patent and that said Letters Patent is hereby corrected as shown below:

On the Title Page

In the Foreign Application Priority Data section of the Letters Patent, please insert the following information:

-- December 21, 2007 Switzerland, 1993/07 --

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,052,203 B2 |
| APPLICATION NO. | : 12/338926 |
| DATED | : November 8, 2011 |
| INVENTOR(S) | : Max Naef |

Page 1 of 1

It is certified that error appears in the above-identified patent and that said Letters Patent is hereby corrected as shown below:

On the Title Page

Insert item 30

In the Foreign Application Priority Data section of the Letters Patent, please insert the following information:

-- December 21, 2007 Switzerland, 1993/07 --

This certificate supersedes the Certificate of Correction issued August 18, 2015.

Signed and Sealed this
Fifth Day of January, 2016

Michelle K. Lee
*Director of the United States Patent and Trademark Office*